United States Patent [19]

Watanabe et al.

[11] Patent Number: 5,545,930
[45] Date of Patent: Aug. 13, 1996

[54] GENERATED-VOLTAGE REGULATOR FOR AUTOMOBILE ENSURING CORRECT KEY SWITCH ON-STATE DETERMINATION

[75] Inventors: Kenichi Watanabe, Katsuta; Yuji Maeda, Hitachiohta; Sakae Hikita, Katsuta, all of Japan

[73] Assignees: Hitachi, Ltd., Tokyo; Hitachi Automotive Engineering, Co., Ltd., Ibaraki-ken, both of Japan

[21] Appl. No.: 295,609

[22] Filed: Aug. 25, 1994

[30] Foreign Application Priority Data

Aug. 30, 1993 [JP] Japan ................................. 5-214410

[51] Int. Cl.⁶ ........................................................ H02J 7/14
[52] U.S. Cl. ............................ 307/10.1; 320/48; 340/455
[58] Field of Search ............................. 307/9.1, 10.1, 307/10.7; 340/455; 324/426; 361/18, 21; 290/16, 50; 322/62–64; 320/48, 5, 39, 40

[56] References Cited

U.S. PATENT DOCUMENTS

| | | | |
|---|---|---|---|
| 3,210,727 | 10/1965 | McLaughlin et al. | 320/48 |
| 3,656,135 | 4/1972 | Ruff | 340/455 |
| 4,316,134 | 2/1982 | Balan et al. | 320/48 |
| 4,342,022 | 7/1982 | Nichol | 340/455 |
| 4,360,772 | 11/1982 | Voss | 320/48 |
| 4,641,079 | 2/1987 | Kato et al. | 320/48 |

FOREIGN PATENT DOCUMENTS

| | | |
|---|---|---|
| 57-116552 | 7/1982 | Japan. |
| 62-81939 | 4/1987 | Japan. |
| 1-99500 | 4/1989 | Japan. |

*Primary Examiner*—William M. Shoop, Jr.
*Assistant Examiner*—Richard T. Elms
*Attorney, Agent, or Firm*—Bardehle, Pagenberg, Dost, Altenburg, Frohwitter, Geissler and Partners

[57] ABSTRACT

The present inventions provides a generated-voltage regulator for an automobile, in which the on state of a key switch can be detected securely without being affected by a change in ambient temperature or the like. According to a selected embodiment, when a generation failure occurs in a power generation circuit 12, a power MOS FET 111 is turned on and off periodically so that a charge lamp 3 is lighted. The on/off state of the MOS FET 111 is detected by a detecting section 1121 of a voltage detecting circuit 112. Being supplied with an on signal from the detecting section 1121, a holding section 1122 turns the level of its output signal c to an "H" level only for a predetermined period. As a result, the key switch 2 is not judged to be off even in the case where the MOS FET 111 is turned on, and the on state of a switch 116 is maintained. Accordingly, the power MOS FET 111 which is low in the level of the drain-source voltage thereof in an on state but is small in size, light in weight and small in a heat value, can be employed as a switching section for lighting the charge lamp. Consequently, there is provided a generated voltage regulator in which not only the on state of the key switch can be detected securely regardless of the change of ambient temperature or the like but reduction both in size and in weight can be attained.

5 Claims, 5 Drawing Sheets

GENERATED-VOLTAGE REGULATOR FOR AUTOMOBILE ENSURING CORRECT KEY SWITCH ON-STATE DETERMINATION

BACKGROUND OF THE INVENTION

The present invention relates to a generated-voltage regulator mounted on an automobile. As an example of a generated-voltage regulator mounted on an automobile, there is a charge indicator described in Japanese Patent application: JP-A 62-81939, incorporated herein by reference.

In the charge indicator described in JP-A 62-81939, a key switch, a charge lamp and a bipolar transistor for lighting or putting on the charge lamp are connected in series to a battery. When the key switch is turned on, the level of an input voltage of a voltage detecting unit is turned to a high ("H") level so that the operation of the voltage regulator starts.

In a normal state, the lamp-lighting transistor is in an off state, so that the charge lamp is not lighted. When, for example, a failure such as breaking of a field winding occurs in a generator, the lamp-lighting transistor is turned on so that the charge lamp is lighted. Since the level of the input voltage of the voltage detecting means is lowered when the lamp-lighting transistor is turned on, it might be predicted that the voltage detecting section may make a misjudgment that the key switch is turned off. In fact, however, the voltage detecting section never makes such a misjudgment, because the collector-emitter voltage of the lamp-lighting transistor upon turn-on is sufficiently higher than the level of the input voltage of the voltage detecting section when the key switch is off.

As another example similar to the aforesaid generated-voltage regulator, there is a charger described in Japanese patent application JP-A 57-116552, also incorporated herein by reference, in which the charging operation of a battery is controlled, depending on the on/off operation of a MOS FET connected to the battery.

As a further example, similar to the aforesaid generated-voltage regulator, there is a field voltage regulator for regulating a field voltage in an AC generator, as described in Japanese patent application JP-A 1-99500, which is also incorporated herein by reference. In this voltage regulator, a field current is regulated, depending on the on/off operation of a field-effect transistor connected in series to a field coil.

In the charge indicator described in JP-A 62-81939, the collector-emitter voltage of the charge lamp-lighting transistor upon turn-on is considered to be sufficiently high as described above. However, if the ambient temperature in the lamp-lighting transistor changes, or if the resistance increases in the charge lamp, wiring in the vicinity of the lamp-lighting transistor, or the like increases, then the collector-emitter voltage of the transistor upon turn-on of the transistor is lowered. Accordingly, in the conventional apparatus, when the charge-lamp lighting transistor is turned on, the operation of the voltage regulator may stop, because of misjudgment that the key switch is turned off.

Further, in the conventional apparatus, a bipolar transistor is used as the charge-lamp lighting transistor. Because the bipolar transistor has a large size and generates a large heating value upon operation, this is a barrier to reduction in size and weight or the voltage regulator.

It may be therefore thought of that a power MOS FET is used as a power transistor for lighting the charge lamp. However, in its on state, the drain-source voltage of the power MOS FET takes a low value, so that it is difficult to be discriminated from the voltage level in the case where the key switch is off. Accordingly, the power MOS FET cannot be employed as the power transistor for lighting the charge lamp, and it is difficult to attain reduction in size and weight of the voltage regulator.

Further, there is a requirement for multiple functions of the voltage regulator, such as a function for interlocking the controlling operation of the voltage regulator with the controlling operation of another controller or the like mounted on the same automobile. To satisfy this requirement, it may be thought of that a digital circuit is used in the voltage regulator for the purpose of integration. However, if a digital circuit is used in the voltage regulator, then a reset signal generating section is required separately, for performing initialization at the time of the starting-up of the voltage regulator. Accordingly, though multiple functions can be achieved, reduction in size and weight is obstructed.

An object of the present invention, therefore, is to provide a generated-voltage regulator for an automobile, in which the on state of a key switch can be detected securely regardless of the on/off operation of a charge lamp lighting transistor.

Another object of the present invention is to provide a generated-voltage regulator for an automobile, in which reduction in size and weight can be achieved.

SUMMARY OF THE INVENTION

According to one aspect of the present invention a generated-voltage regulator for regulating a voltage generated by a generator in an automobile has a generated-voltage regulator and a switch for passing a current through a charge alarm section in a closed state of the switch. A generation failure detection/driving section detects a generation failure in a power generation circuit and intermittently opens the switch at the time of detection of the generation failure. A constant voltage generator supplies a constant voltage to the generated-voltage regulator and the generation failure detection/driving section. A key switch on-state detecting section operates the constant voltage generating section when the key switch is closed and when the switch is opened intermittently. Such a regulator allows for a switch whose voltage between opposite ends thereof in its "on" state is low and which is employed as a switch for lighting the charge lamp. Therefore, there is provided a generated voltage regulator in which the "on" state of the key switch is detected accurately without influence of a change of ambient temperature or the like.

According to another aspect of the present invention, a generated-voltage regulator for regulating a voltage generated by a generator in an automobile has a generated-voltage regulator and a switch for passing a current through a charge alarm section in a closed state of the switch. A generation failure detection/driving section detects a generation failure in the power generation circuit and closes the switch at the time of detection of the generation failure. A constant voltage generator generates a main constant voltage and an auxiliary voltage. An initialization signal generator generates, as an initialization signal, the main constant voltage in a period where the auxiliary voltage is higher than the main constant voltage, at the time of the rising of the main constant voltage and the auxiliary voltage. A key switch on-state detecting section operates the constant voltage generator when the key switch is closed. Such an embodiment provides for a generated-voltage regulator in which, not only a digital circuit is used without any necessity of providing a large-sized reset signal generating circuit or the like separately, but reduction in size and weight is achieved.

In accordance with further embodiments of the invention, the aforementioned generated-voltage regulator is constructed so that the generation failure detection/driving section opens the switch intermittently at the time of detection of the generation failure, whereas the key switch on-state detecting section operates the constant voltage generator even when the switch is opened intermittently. In this case, there is provided a generated-voltage regulator in which suppression of heat generation, use of a digital circuit and reduction in size and weight is achieved.

According an even further embodiment, a generated-voltage regulator for an automobile, has a power generation circuit, a storage battery, and a charge alarm section connected to the storage battery through a key switch. A generated-voltage regulator controls a generated-voltage of the power generation circuit. A switch is connected in series to the charge alarm section so as to pass a current through the charge alarm section in a closed state of the switch. A generation failure detection/driving section detects a generation failure in the power generating circuit and intermittently opens the switch at the time of detection of the generating failure. A constant voltage generator supplies a constant voltage to the generated-voltage regulator and the generation failure detection/driving section. A key switch on-state detecting section operates the constant voltage generator when the key switch is closed and when the switch is opened intermittently.

According to still a further embodiment, a generated-voltage regulator for an automobile, has a power generation circuit, a storage battery, a charge alarm connected to the storage battery through a key switch, a generated-voltage regulator for controlling a voltage generated by the power generation circuit, and a switch connected in series to the charge alarm section so as to pass a current through the charge alarm in a closed state of the switch. A generation failure detection/driving section detects a generation failure in the power generation circuit and closes the switch at the time of detection of the generation failure. A constant voltage generator generates a main constant voltage to be supplied to the generated-voltage regulating section and the generation failure detection/driving section and generates at least one kind of auxiliary voltage which is different from the main constant voltage both in a time constant of a leading edge and in a steady-state voltage value. One of the auxiliary voltages has a leading edge time constant smaller than that of the main constant voltage and has a steady-state voltage value smaller than that of the main constant voltage. An initialization signal generator uses the main constant voltage as a voltage source therefor and for generating, as an initialization signal, the main constant voltage in a period where the auxiliary voltage is higher than the main constant voltage, at the time of the rising of the main constant voltage and the auxiliary voltage on the basis of comparison between the main constant voltage and the auxiliary voltage to thereby supply the initialization signal to the generated-voltage regulating section and the generation failure detection driving section. A key switch on-state detecting section operates the constant voltage generating section when the key switch is closed.

DESCRIPTION OF THE DRAWINGS

For a more complete understanding of the present invention and for further advantages thereof, reference is made to the following Detailed Description taken in conjunction with the accompanying drawings, in which.

It is to be noted, however, that the appended drawings illustrate only typical embodiments of this invention and are therefore not to be considered limiting of its scope, for the invention may admit to other equally effective embodiments.

DETAILED DESCRIPTION

A generated-voltage regulator for an automobile according to embodiments of the present invention will be described below with reference to the accompanying drawings.

Figure 1:
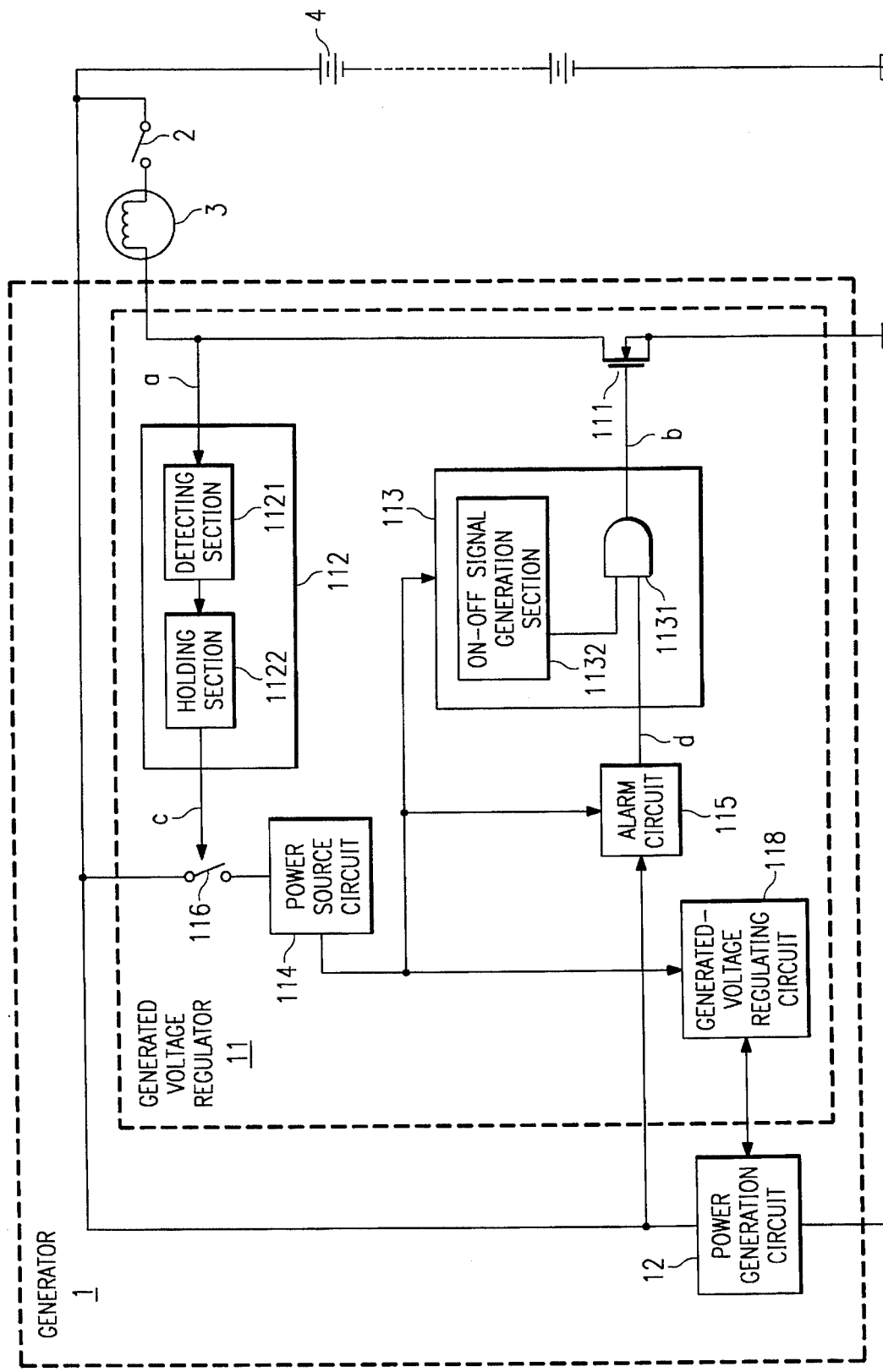
FIG. 1 is a schematic block diagram showing a first embodiment of the present invention.
Figure 2A:
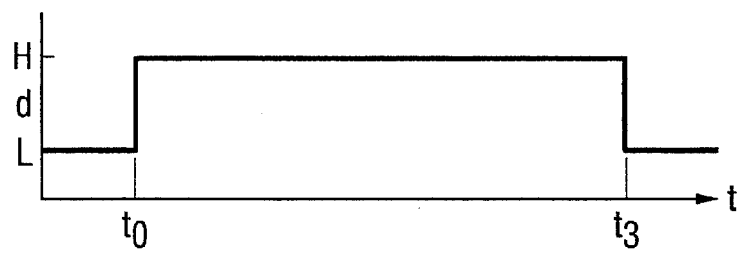
FIG. 2 is a graph of signal waveforms in the embodiment shown in FIG. 1.
Figure 2B:
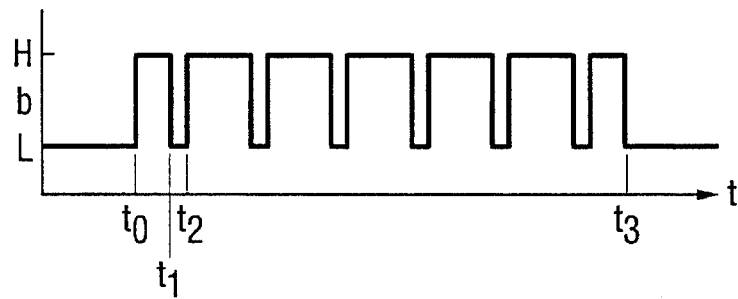
Figure 2C:
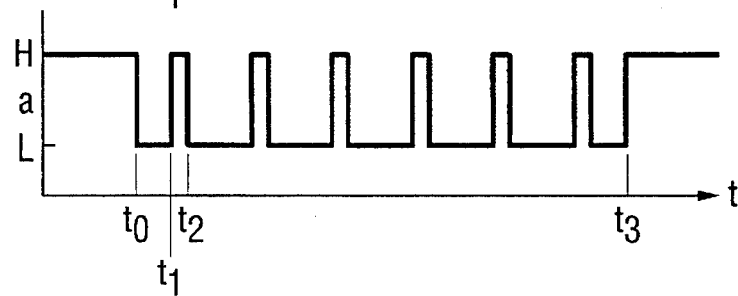
Figure 2D:
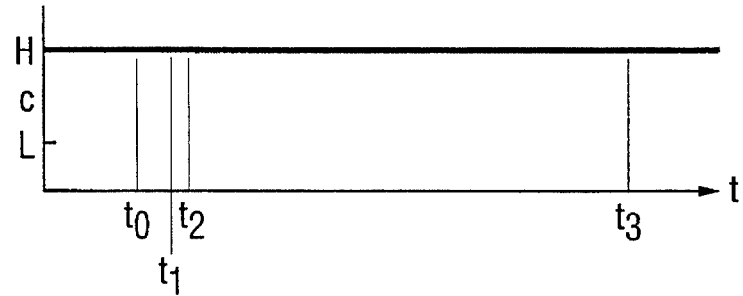

FIG. 1 is a schematic block diagram showing a first embodiment of the present invention. Referring to FIG. 1, the reference numeral 1 designates a generator including a generated-voltage regulator 11 and a power generation circuit 12. The reference numeral 2 designates a key switch, the reference numeral 3 designating a charge lamp (charge alarm section), the reference numeral 4 designating a battery (storage battery) charged by the generator 1. The charge lamp 3 is electrically connected to the battery 4 through the key switch 2. The current conduction of the charge lamp 3 is controlled by the voltage regulator 11. The voltage regulator 11 includes a power MOS FET 111 (switching element) for driving the charge lamp, a voltage detecting circuit (key switch on-state detecting section) 112, a driving circuit 113, an power source circuit 114 (constant voltage generating section), an alarm circuit 115, a switch 116, and a generated-voltage regulating circuit 118. The alarm circuit 115 and the driving circuit 113 constitutes a generation failure detection/driving section.

The charge lamp 3 is grounded through the drain and source of the power MOS FET 111. The voltage detecting circuit 112 has a detecting section 1121 detecting the electric potential voltage of the connection point between the charge lamp 3 and the power MOS FET 111, and a signal level holding section 1122 holding the level of an output signal c for a predetermined period (which will be described later) in accordance with a detection signal from tile detecting section 1121. The switch 116 is closed and opened on the basis of the output signal from the holding section 1122 so that the battery and the power generation circuit 12 are connected to and disconnected from the power source circuit 114, respectively. The power source circuit 114 receives a voltage through the switch 116, changing the voltage to a constant voltage, supplying the constant voltage to the generated-voltage regulating circuit 118, the alarm circuit 115 and the driving circuit 113.

The generated-voltage regulating circuit 118 regulates the voltage generated from the power generation circuit 12. The alarm circuit 115 is a circuit for detecting a generation failure in the power generation circuit 12. Namely, when the voltage generated from the power generation circuit 12 is lower than a predetermined voltage, the alarm circuit sets the level of an output signal d thereof to an "H" level. The driving circuit 113 has an on/off signal generating section 1132 generating an on/off signal (which will be described later), and an AND circuit 1131. The output signal d of the alarm circuit 115 and the on/off signal of the on/off signal generating section 1132 are supplied to input terminals of the AND circuit 1131. The output signal b of the AND circuit 1131 is supplied to the gate of the power MOS FET 111.

In the aforementioned construction, when the key switch 2 is turned on, the drain-source voltage of the power MOS FET 111 becomes equal to the voltage of the battery 4, because the power MOS FET 111 is off at the time of a starting-up operation. The detecting section 1121 of the voltage detecting circuit 112 detects the drain-source voltage at this time to thereby determine that the key switch 2 has been turned on. Then, the level of the signal c from the holding section 1122 changes to an "H" level, so that the switch 116 is closed. As a result, the battery 4 and the power source circuit 114 are electrically connected with each other so that a current is supplied to the power source circuit 114.

When a current is supplied to the power source circuit 114, a voltage from the power source circuit 114 is supplied to the generated-voltage regulating circuit 118, the alarm circuit 115 and the driving circuit 113 to thereby start the operations of these circuits 118, 115 and 113. From the on/off signal generating section 1132 of the driving circuit 113, the on/off signal, having an off duty ratio of 0.3% is supplied to the AND circuit 1131.

When a generation Failure is detected by the alarm circuit 115, the level of the output signal d is turned to an "H" level. When, for example, the level of the signal d is turned to an "H" level at a time point $_h$, as represented by the waveform (A) in FIG. 2, the output signal b of the AND circuit 1131 becomes as an on/off signal, having the off duty ratio of 0.3% which is equal to that of the output signal of the on/off signal generating section 1132, as represented by the waveform (B) in FIG. 2. The power MOS FET 111 is then turned on/off (opened intermittently) on the basis of the output signal b. As a result, the charge lamp 3 is lighted and at the same time the input signal a of the voltage detecting circuit 112 becomes as an on/off signal having the on duty ratio of 0.3% as represented by the waveform (C) in FIG. 2. The on/off signal a is supplied to the holding section 1122 through the detecting section 1121.

Figure 3A:
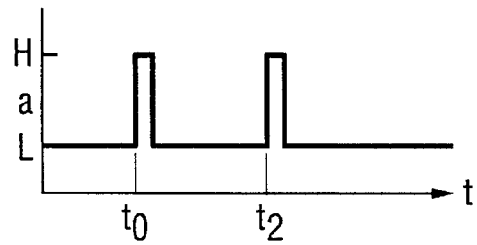
FIG. 3 is a graph used for explaining input/output signals of the voltage detecting circuit.
Figure 3B:
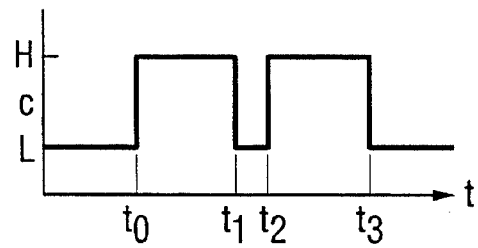

When the level of the signal from the detecting section 1121 is turned to an "H" level, the holding section 1122 holds the level of the output signal c to an "H" level for a predetermined period. Namely, when the signal a whose level is held to an "H" level(for example,for 260μsec.) is supplied to the voltage detecting circuit 112 at the time point $t_0$ as represented by the waveform (A) in FIG. 3, the holding section 1122 holds the level of the signal c to an "H" level from the time point $t_0$, to a time point $t$, (the waveform (B) in FIG. 3). When signal a is supplied to the voltage detecting circuit 112 again at a time point $t_2$, the holding section 1122 holds the level of the signal c to an "H" level from time point $t_2$, to a time point $_3$. The predetermined period in which the holding circuit 1122 holds the level of the signal c to an "H" level is set to be longer than the on period (from the time point $t_1$ to the time point $t_2$ in FIG. 2) of the on/off signal a. When, for example, the on period of the signal a is 8 msec., the period in which the level of the signal c is held to an "H" level is set to be in a range from 16 to 18 msec.

Accordingly, the level of the signal c can be kept to an "H" level even when the power MOS FET 111 is switched on/off, so that the switch 116 is never turned off. When the voltage level of the power generation circuit 12 is restored to a normal level at a time point $_3$ in FIG. 2, the levels of the signals d and b are turned to low ("L") levels respectively. As a result, the power MOS FET 111 is turned off, so that the level of the signal a is turned to an "H" level.

As described above, according to the first embodiment of the present invention, the power MOS FET 111 is turned off intermittently, or, in other words, switched on/off periodically in case of occurrence of a generation failure in the power generation circuit 12, so that the charge lamp 3 is lighted. In the case where the on/off operation of the MOS FET 111 is detected by the voltage detecting circuit 112, the key switch 2 is not judged to be off so that the on state of the switch 116 is maintained. Accordingly, there is provided a generated-voltage regulator in which the on state of the key switch 2 can be detected securely even in the case where the level of the voltage between opposite ends of the charge-lamp lighting transistor in an on state becomes low in accordance with the change of ambient temperature or the like.

Further, according to the first embodiment of the present invention, the power MOS FET 111, in which the level of the drain-source voltage thereof in an on state is low, is employed as a switching means for lighting the charge lamp. Accordingly, there is provided a generated-voltage regulator 11 in which not only the on state of the key switch 2 is detected securely, but suppression of heat generation and reduction in size and weight is achieved.

Although FIG. 1 shows the case where a power MOS FET is used as the charge-lamp lighting transistor, according to another embodiment, a bipolar transistor is used as the charge-lamp lighting transistor. In this case, suppression of heat generation and reduction in size and weight cannot be expected compared with the case of the embodiment shown in FIG. 1.

Figure 4:
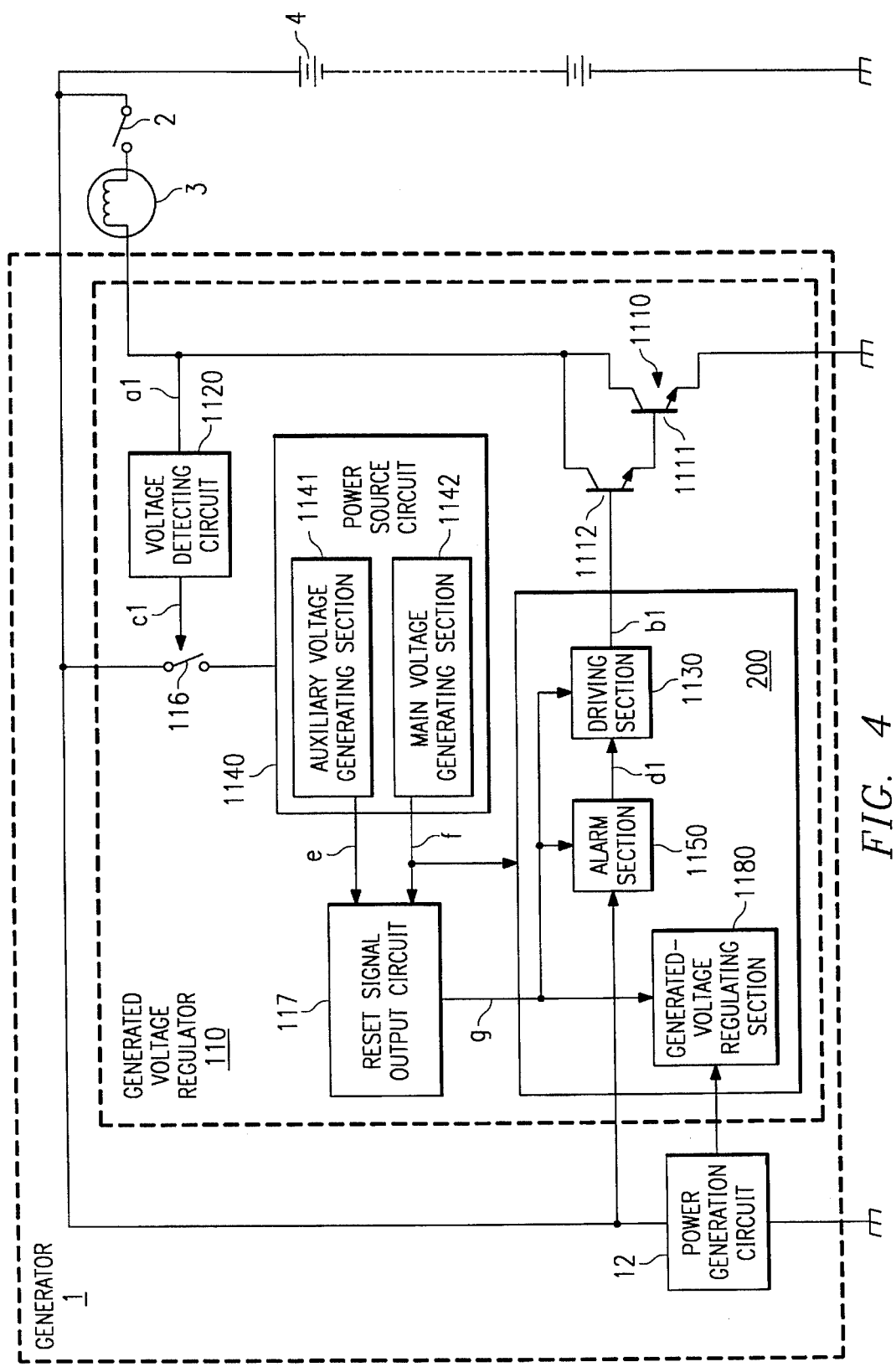
FIG. 4 is a schematic block diagram showing a second embodiment of the present invention.

FIG. 4 is a schematic block diagram showing a generated-voltage regulator 110 according to a second embodiment of the present invention. In FIG. 4, like parts corresponding to those of FIG. 1 are marked with the same references and therefore need not be described.

Referring to FIG. 4, the charge lamp 3 is grounded through a lamp-lighting transistor (switching element) 1 110 composed of bipolar transistors 1111 and 1112 arranged in a Darlington connection. The reference numeral 1120 designates a voltage detecting circuit (on-state detecting section of the key switch). The voltage detecting circuit 1120 detects the collector-emitter voltage al of the transistor 1110. When the level of the detected voltage al is higher than or equal to a predetermined level, the voltage detecting circuit 1120 turns the level of an output signal cl to an "H" level to thereby turn on the switch 116. The reference numeral 1140 designates an power source circuit (constant voltage generating section). The power source circuit 1140 has an auxiliary voltage generating section 1141 generating an auxiliary voltage e, and a main voltage generating section 1142 generating a main voltage f. As represented by the waveform (A) in FIG. 6, the auxiliary voltage g is lower in a steady-state voltage level and smaller a time constant at a leading edge than the main voltage f. Both the main voltage f and the auxiliary voltage g are supplied to a reset signal output circuit (initialization signal generating section) 117. The main voltage f is also supplied to a digital circuit 200, so that the main voltage f is the driving voltage of the digital circuit 200.

Figure 5:
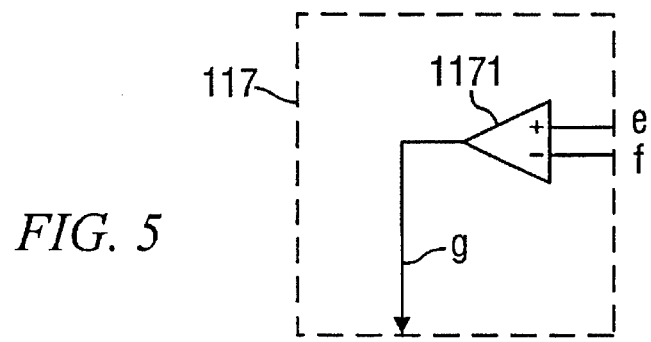
FIG. 5 is a diagram showing an example of the reset signal output circuit.

FIG. 5 shows an example of the reset signal output circuit 117 which is constituted by a comparator 1171. The main voltage f is supplied to the comparator 1171 as a driving voltage and also supplied to an inverted input terminal thereof. The auxiliary voltage e is supplied to a non-inverted input terminal of the comparator 1171. At the time of the starting-up of the power source circuit 1140, the voltages e and f rise at a time point $t_0$ as represented by the waveform (A) in FIG. 6. The auxiliary voltage e reaches to a voltage value Ve at a time point $t_1$ and then is kept constant. The main voltage f reaches to the voltage value Ve at a time point $t_2$ later than the time point $t_1$ and then increases to a value Vf till a time point $t_3$ after which the voltage f is kept constant.

The output signal g of the comparator 1171 having the input terminals supplied with the voltages e and f in the same manner as the main voltage f of the operating voltage of the comparator 1171 rises, in a period (from the time point $t_0$ to the time point $t_2$) where the voltage e is higher than the voltage f. The output signal g falls at the time point $t_2$ where the voltage e becomes lower than the voltage f, as represented by the waveform (B) in FIG. 6. The signal g serves as a reset signal (initialization signal) for the digital circuit 200.

According to one embodiment, when the voltages f and e from the power source circuit 1140 are used as described above, the reset signal g is generated by a simple structure of a circuit such as the comparator 1171. The reset signal g is supplied to the generated-voltage regulating section 1180, alarm section 1150 and driving section 1130 of the digital circuit 200. As a result, these sections are initialized and then their operations are started respectively. The alarm section 1150 and the driving section 1130 constitute a generation failure detection/driving section.

In the case where a generation failure occurs in the power generation circuit 12, the generation failure is detected by the alarm section 1150. Upon detection of the generation failure, the alarm section 1150 sets the level of its output signal d1 to be supplied to the driving section 1130 to an "H" level. As a result, the driving section 1130 sets the level of the output signal b1 to an "H" level to thereby turn on the transistors 1110. When the transistors 1110 are turned on, the charge lamp 3 is lighted. In this case, tile collector-emitter voltage of tile transistor 1110 thus turned on is high, because the transistors 1110 comprise bipolar transistors. Accordingly, the voltage detecting circuit 1120 never makes a misjudgment that the key switch 2 has been turned off.

As described above, according to one embodiment of the present invention, a reset signal is generated by the comparator 1171 with simple construction and by using the main constant voltage f and auxiliary voltage g, which is smaller in a time constant of a leading edge and lower in voltage level than the main constant voltage f, both generated from the power source circuit 1140. In one embodiment, a digital circuit is used in the generated-voltage regulator 110 without using a large-sized reset signal generating circuit or the like separately, while reduction in size and weight of the voltage regulator 110 is achieved.

Figure 7:
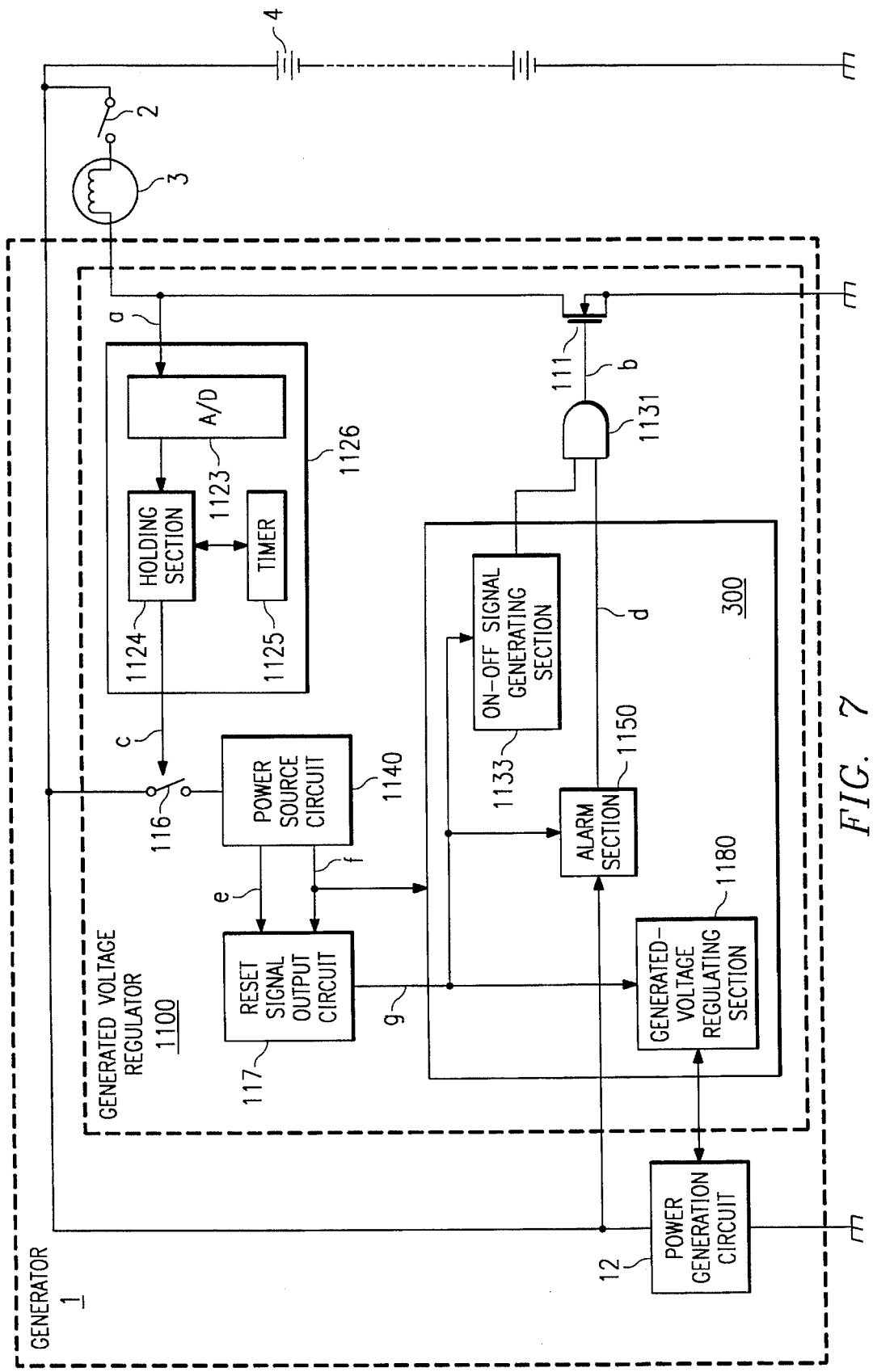
FIG. 7 is a schematic block diagram showing a third embodiment of the present invention.

FIG. 7 is a schematic block diagram of a generated-voltage regulator 1100 according to another embodiment of the present invention. In FIG. 7, like parts corresponding to those of the first and second embodiments are marked with the same references and therefore need not be described. The FIG. 7 embodiment shows the case where a power MOS FET 111 is used as the charge-lamp lighting transistor and where there is used a digital circuit 300, reset on the basis of a reset signal g obtained from a reset signal output circuit 117, and a voltage detecting circuit 1126 configured as a digital circuit.

Namely, in FIG. 7, the voltage detecting circuit 1126 has an analog-to-digital (A/D) conversion section 1123 converting the voltage a into digital signals, a holding section 1124, and a timer 1125. The digital circuit 300 has a generated-voltage regulating section 1180, an alarm section 1 150, and an on/off signal generating section 1133. The on/off signal generating section 1133 supplies an on/off signal which is similar to that from the on/off signal generating section 1132 shown in FIG. 1 to one input terminal of an AND circuit 1131. The output signal d from the alarm section 1150 is supplied to the other input terminal of the AND circuit 1131. The output signal b from the AND circuit 1131 is supplied to the gate of the power MOS FET 111.

Figure 6A:
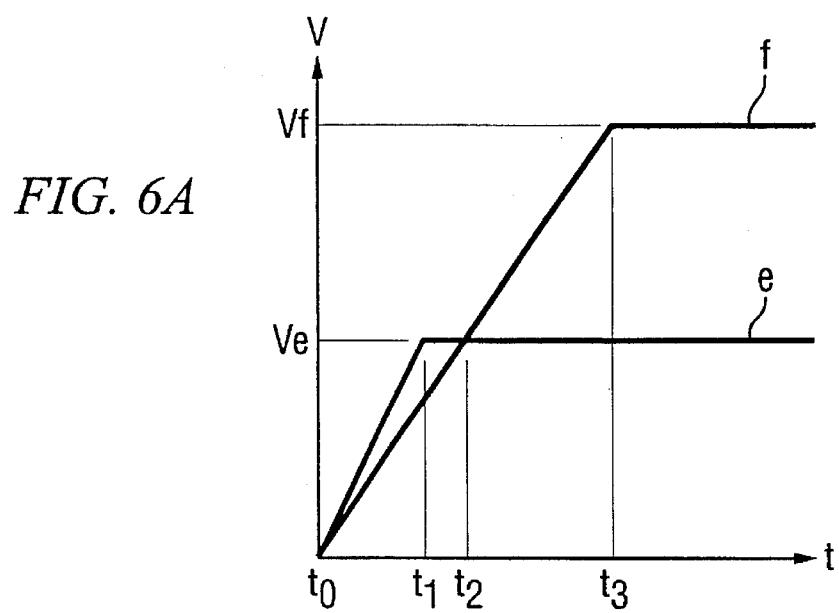
FIG. 6 is a graph showing waveforms of input/output signals of the reset signal output circuit.
Figure 6B:
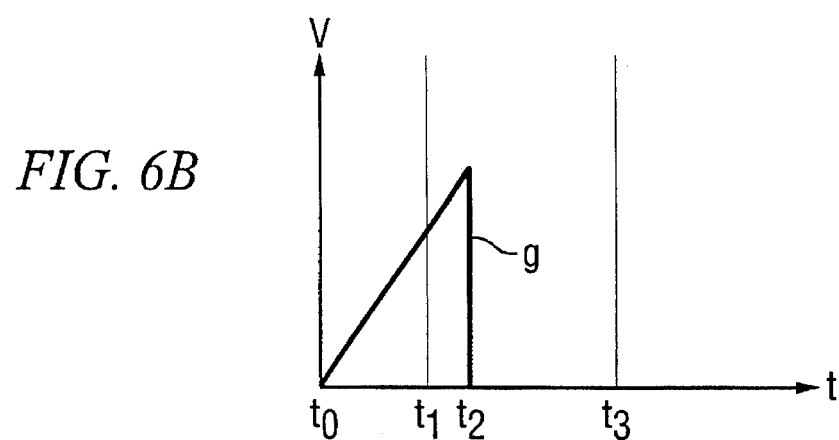

When the key switch 2 is turned on, the voltage detecting circuit 1126 detects the on state of the key switch 2 and turns on the switch 116. As a result, the auxiliary voltage e and main voltage f from the power source circuit 1140 are supplied to the reset signal output circuit 117. The main voltage f is also supplied to the digital circuit 300. The auxiliary voltage e and main voltage f are voltages having characteristics as represented by the waveform (A) in FIG. 6, so that the reset signal g as represented by the waveform (B) in FIG. 6 is generated by the reset signal output circuit 117. The reset signal g is supplied to the generated-voltage regulating section 1180, alarm section 1150 and on/off signal generating section 1133, so that the respective operations of these sections are started.

When a generation failure occurs, the level of the output signal d of the alarm section 1150 is turned to an "H" level so that a signal as represented by the waveform (B) in FIG. 2 is supplied from the AND circuit 1131 to the gate of the power MOS FET 111. Then, the voltage g serves as an on/off signal as represented by the waveform (C) in FIG. 2 and is supplied to the holding section 1124 through-the A/D conversion section 1123. The holding section 1124 then starts the timer 1125 and thereafter holds the level of the signal g to an "H" level for a predetermined period. The operation of the holding section 1124 is the same as that of the holding section 1122 shown in FIG. 1. Namely, the holding section 1124 holds the level of the signal c to an "H" level for a period which is sufficiently longer than the period in which the on/off signal g is in an "H" level.

As described above, according to the FIG. 7 embodiment of the present invention, the power MOS FET 111 is turned off intermittently at the time of occurrence of a generation failure in the power generation circuit 12, so that the charge lamp 3 is lighted. When the on/off operation of the MOS FET 111 is detected by the voltage detecting circuit 1126, the key switch 2 is not judged to be off so that the on state of the switch 116 is maintained. Further, a reset signal can be generated by the reset signal output circuit 117 with simple construction and by using the main constant voltage f and auxiliary voltage g generated from the power source circuit 1140.

Accordingly, not only the power MOS FET 111, whose drain-source voltage is a low level in an on state, can be employed as a switching section for lighting the charge lamp, but also there can be employed a digital circuit without using a large-sized reset signal power generation circuit or the like separately. Accordingly, there is provided a generated-voltage regulator 1100 in which not only the on state of the key switch 2 is detected securely without influence of the change of ambient temperature or the like, but also there is suppression of heat generation, reduction in size and weight and use of a digital circuit in the voltage regulator can be achieved.

Although the aforementioned embodiments show the case where a power MOS FET is used as the charge-lamp lighting transistor, the present invention is applied in alternative embodiments to the case where another transistor, other than the power MOS FET is used as the charge-lamp lighting transistor as long as the other transistor is small in size and the voltage between opposite ends thereof in a turned on state is small.

Although the aforementioned embodiments show the case where the power source circuit 1140 generates one kind of auxiliary voltage e other than the main constant voltage f, embodiments of the present invention are also applied to the case where the power source circuit 1140 generates two or more kinds of auxiliary voltages different in a steady-state voltage value and a time constant at a leading edge from the main constant voltage. For example, in such an embodiment, the power source circuit generates a second auxiliary voltage in which a leading edge time constant is equal to the auxiliary voltage e, but a steady-state voltage value is larger than the auxiliary voltage e and smaller than the main voltage. In this case, the reset signal output circuit generates an initialization signal which rises at the time point $t_2$ whereafter the auxiliary voltage e is lower than the voltage f and falls at a time point whereafter the second auxiliary voltage is lower than the voltage f.

What is claimed is:

1. A generated-voltage regulator for an automobile, comprising: a power generation circuit driven by a driving mechanism for the automobile to generate electric power;
   a storage battery charged by said power generation circuit;
   a charge alarm connected to said storage battery through a key switch;
   a generated-voltage regulator controlling a generated-voltage of said power generation circuit;
   a switch connected in series to said charge alarm to pass a signal through said charge alarm in a closed state of said switch;
   a generation failure detection/driving means for detecting a generation failure in said power generation circuit and for intermittently opening and closing said switch at the time of detection of the generation failure;
   a constant voltage generator supplying a constant voltage to said generated-voltage regulator and said generation failure detection/driving means; and a key switch on-detecting section for operating said constant voltage generator when a low voltage period in which a voltage at a connection point between said charge alarm and said switch is lower than a predetermined voltage is shorter than predetermined period, so that said key switch on detecting section operates said constant voltage generator when said key switch is closed and when said switch is opened and closed intermittently.

2. A generated-voltage regulator for an automobile comprising:
   a power generation circuit driven by a driving mechanism for the automobile to generate electric power;
   a storage battery charged by said power generation circuit;
   a charge alarm connected to said storage battery through a key switch;
   a generated-voltage regulator for controlling a generated-voltage of said power generation circuit;
   a switch connected to said charge alarm so as to pass a current through said charge alarm in a closed state of said switch;
   a generating failure detection/driving section for detecting a generation failure in said power generation circuit and for closing said switch at the time of detection of the generation failure;
   a constant voltage generator for generating a main constant voltage to be supplied to said generated-voltage regulator and said generation failure detection/driving section and generating at least one kind of auxiliary voltage which is different from said main constant voltage both in a time constant of a leading edge and in a steady-state voltage value, one of the auxiliary voltages having a leading edge time constant smaller than a leading edge time constant of said main constant voltage and a steady-state voltage value smaller than that a steady-state voltage value of said main constant voltage;
   an initialization signal generating section using said main constant voltage as a voltage source therefor and for generating, as an initialization signal, the main constant voltage, in a period where the auxiliary voltage is higher than the main constant voltage, at the time of the rising of said main constant voltage and said auxiliary voltage on the basis of comparison between said main constant voltage and said auxiliary voltage to thereby supply said initialization signal at least to said generated-voltage regulator and said generation failure detection/driving section; and
   a key switch on-state detecting section for operating said constant voltage generator when said key switch is closed.

3. A generated-voltage regulator for an automobile as in claim 2, wherein said generation failure detection/driving section opens said switch intermittently at the time of detection of the generation failure, and said key switch on-state detecting section operates said constant voltage generator also when said switch is opened intermittently.

4. A generated-voltage regulator for an automobile as in claim 1 or 3, wherein said key switch on-state detecting section detects the opening of said switch on the basis of a voltage between the opposite ends of said switch so that said key switch on-state detecting section operates said constant voltage generator during a predetermined period longer than an opening/closing period of said switch when the opening of said switch is detected.

5. A generated-voltage regulator for an automobile as in claim 1 or 3, wherein said switch is a power MOS FET.

* * * * *